US006593398B2

(12) United States Patent
Breton et al.

(10) Patent No.: US 6,593,398 B2
(45) Date of Patent: Jul. 15, 2003

(54) INK COMPOSITIONS

(75) Inventors: Marcel P. Breton, Mississauga (CA); Shadi L. Malhotra, Mississauga (CA); Gregory J. Kovacs, Mississauga (CA)

(73) Assignee: Xerox Corporation, Stamford, CT (US)

( * ) Notice: Subject to any disclaimer, the term of this patent is extended or adjusted under 35 U.S.C. 154(b) by 13 days.

(21) Appl. No.: 10/046,411

(22) Filed: Jan. 16, 2002

(65) Prior Publication Data

US 2002/0058731 A1 May 16, 2002

Related U.S. Application Data

(63) Continuation of application No. 09/342,947, filed on Jun. 29, 1999.

(51) Int. Cl.$^7$ .......................... C09D 11/10; C08G 59/04; C08G 65/26; C08L 37/00; C08L 63/00
(52) U.S. Cl. ................. 523/160; 523/400; 523/414; 523/424; 524/548; 528/87; 528/97
(58) Field of Search .................... 523/160, 161, 523/400, 414, 424; 524/548, 553, 593; 528/87, 97, 98; 106/31.29, 31.61

(56) References Cited

U.S. PATENT DOCUMENTS

| 4,210,566 | A | * | 7/1980 | Murray ...................... 523/451 |
| 4,799,068 | A | * | 1/1989 | Saito et al. .................... 347/55 |
| 5,411,768 | A | * | 5/1995 | Knell et al. ................. 427/386 |
| 5,755,860 | A | * | 5/1998 | Zhu ........................ 106/31.15 |
| 6,017,385 | A | * | 1/2000 | Malhotra et al. ........ 106/31.29 |
| 6,096,124 | A | * | 8/2000 | Wong et al. ............. 106/31.43 |
| 6,110,266 | A | * | 8/2000 | Gonzalez-Blanco et al. ..... 106/31.65 |
| 6,322,620 | B1 | * | 11/2001 | Xiao ...................... 106/31.92 |

* cited by examiner

Primary Examiner—Callie Shoshu
(74) Attorney, Agent, or Firm—Robert Thompson

(57) ABSTRACT

An ink composition comprised of (1) a polymer; (2) an acid compound of the formula $CH_3(CH_2)_m(CH_2CH=CH)_p(CH_2)_nCOOH$ wherein n, m, and p represent the number of segments; (3) a conductive component; (4) a lightfastness component; and (5) a colorant.

31 Claims, No Drawings

INK COMPOSITIONS

This application is a continuation of Application(s) No(s). 09/342,947, filed Jun. 29, 1999.

RELATED PATENTS

Inks are illustrated in U.S. Pat. Nos. 5,931,995; 5,958,119; 5,902,390; 5,922,117; 6,110,265; 6,096,124; 6,071,333; 6,086,661; 6,096,125; 6,066,200; 6,106,601; 6,106,599, and U.S. Pat. No. 5,876,492, the disclosures of each being totally incorporated herein by reference.

The appropriate components of the above copending applications may be selected for the inks and processes of the present invention in embodiments thereof.

BACKGROUND OF THE INVENTION

The present invention is directed to robust, that is, for example, firm and rigid, phase change conductive inks, that is inks that change from a liquid state to solid state in a suitable period of time, for example from about 1 to about 100 milliseconds and preferably in less than about 10, such as from about 2 to about 7 milliseconds, and more specifically, the present invention relates to (1) inks containing solid polymeric additives with hardness values of, for example, from about 80 to about 95, and preferably from about 85 to about 95, hardness being, for example, a property of solids and plastics that is indicated by their solidity and firmness as measured by their resistance to indentation by an indenter of fixed shape and size under a static load; (2) inks that are conductive that is, for example, inks that possess the quality or capability of transmitting electrical signals generated by electric field assisted acoustic ink jet printing processes and apparatuses and which inks possess, for example, controlled jettability thereby permitting low edge raggedness images such as from about 1 to about 3 microns.

The hardness of the ink polymeric additive material can be measured with a Digital-Pencil style Durometer, Model 211B-00 PTC, obtained from Pacific Transducer Corporation, using ASTM Standard specifications for resistance to penetration with a conical [30 degrees included angle] indenter and applying 1 killigram load. The hardness range for elastomeric plastics as measured with this instrument is from about 1 to about 100, the latter being the highest measurable value. The conductivity of a material can be measured by the reciprocal of resistivity, which is the capacity for electrical resistance. The conductivity values of inks expressed as log (pico.mho/cm) and recited herein were measured under melt conditions at 150° C. by placing an aluminum electrode in the molten ink and reading the resistivity output on a GenRad 1689 precision RLC Digibridge at a frequency of 1 K.Hz. Conductivity expressed in terms of [log (pico.mho/cm)] is calculated from the reciprocal of resistivity. Generally, the invention inks possess conductivity values of, for example, from about 2 to about 8 log (pico.mho/cm) and preferably in the range of from about 6 to about 6.5 log (pico.mho/cm).

More specifically, the present invention relates to robust phase change conductive inks with a melting point of from about 60° C. to about 150° C., and preferably from about 70 to about 90° C., especially useful for electric field assisted acoustic ink jet printing with enhanced jettability, acoustic ink processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in a number of the above recited copending applications such as an acoustic ink printer for printing images on a record medium.

The inks of the present invention in embodiments thereof are comprised of (1) a solid polymeric additive that has a hardness value of from about 80 to about 93 with a viscosity of from about 50 to about 2,000 cps and preferably from about 50 to about 500 cps at, for example, 150° C. such additive being, for example, poly(bisphenol A-co-epichlorohydrin), glycidyl end-capped; [$M_n$=1075; hardness value of 93.5; Aldrich # 40,545-0]; poly[(o-cresyl glycidyl ether)-co-formaldehyde] [$M_n$=870; Mp=70 to 75° C.; Aldrich #40,551-5; hardness value of 92], and which additives can, for example, substantially fill the pores of a substrate, such as paper, and which additive polymer possesses, for example, a melting point of lower than about 135° C. and preferably from about 60° C. to about 100° C.; (2) a viscosity modifying compound that, for example, can lower the viscosity of the ink to a value of, for example, from about 10 to about 20 centipoise and which additive compound is selected from the group consisting of aliphatic unsaturated acids of the general formula $CH_3(CH_2)_m(CH_2CH=CH)_p(CH_2)_nCOOH$(1) when m=0, p=1 and n=1; trans-3-hexenoic acid, $CH_3(CH_2CH=CH)(CH_2)COOH$, (Aldrich #19,309-7); (2) when m=1, p=1 and n=0; trans-2-hexenoic acid, $CH_3(CH_2)(CH_2CH=CH)COOH$ (Aldrich #19,308-9); (3) when m=3, p=1 and n=0; 2-octenoic acid, $CH_3(CH_2)_3(CH_2CH=CH)COOH$ (Aldrich #28,692-3), which acids are preferably liquids and possess, for example, a boiling point of equal to about, or higher than about 150° C. (Centigrade), and more specifically, with a boiling point of from about 150° C. to about 225° C., and which acids preferably possess a low acoustic loss, which enables a reduction, or minimization of energy consumption, and which acoustic loss is, for example, below, or about equal to 60 dB/mm; (3) a conductive phosphorous or sulfur compound, (4) a lightfastness antioxidant, (5) and a colorant such as a dye, a colorant, or mixtures thereof, and wherein there can be generated with such inks in embodiments excellent developed images on plain and coated papers with acceptable image permanence, excellent projection efficiency on transparencies without a post fusing step, and excellent crease resistance, and wherein the inks possess acceptable, and in embodiments superior lightfastness, for example from about 90 to about 100 percent and superior waterfastness, for example from about 95 to 100 percent. Moreover, in embodiments of the present invention there is enabled the elimination, or minimization of undesirable paper curl since water need not be present, and it is preferred in embodiments that there be an absence of water. When water is not present in the inks a dryer can be avoided thereby minimizing the cost of the acoustic ink jet apparatus and process.

PRIOR ART

In acoustic ink printing, the printhead produces approximately 2.2 picoliter droplets by an acoustic energy process. The ink under these conditions should preferably display a melt viscosity of about 6 to about 20 centipoise or less at the jetting temperature. Furthermore, once the ink is jetted onto the paper, the ink image should be of excellent crease property, and should be non-smearing waterfast, possesses excellent transparency and possesses excellent fix qualities. In selecting an ink for such applications, it is desirable that the ink vehicle display a low melt viscosity, such as from about 1 centipoise to about 25 centipoise in the acoustic head, while also displaying solid like properties after being jetted onto paper. Since the acoustic head can tolerate a temperature of, for example, up to about 180° C., and preferably up to a temperature of from about 140° C. to about 160° C., the vehicle for the ink should preferably display liquid like properties, such as a viscosity of 1 to about 10 centipoise at a temperature of from about 75° C. to about 165° C., and solidify or harden after jetting onto paper such that the ink displays a hardness value of from about 0.1 to about 0.5 millimeter measured by utilizing a penetrometer according to the ASTM penetration method D1321.

Ink jet printing processes that utilize inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink, which is melted in the apparatus, will not be subject to evaporation or spillage during periods of non-printing. The vehicle selected possesses a low critical temperature to permit the use of the solid ink in a thermal ink jet printer. In thermal ink jet printing processes employing phase change inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase change ink jets are somewhat similar to thermal ink jets; however, a phase change ink contains no solvent. Thus, rather than being liquid at room temperature, a phase change ink is typically a solid or phase change having a wax-like consistency. These inks usually need to be heated, for example, to approximately 100° C. before the ink melts and turns into a liquid. With phase change inks, a plurality of ink jet nozzles is provided in a printhead. A piezoelectric vibrating element is located in each ink channel upstream from a nozzle so that the piezoelectric oscillations propel ink through the nozzle. After the phase change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink coated paper may be necessary, and which papers are usually more costly than plain paper.

One advantage of phase change ink is the inks ability to print on plain paper since the phase change ink quickly solidifies as it cools and, since it is waxy in nature the ink does not normally soak into a paper medium. However, phase change ink jet system can be cumbersome in structure and in design, that is, the associated integrated electronics of a thermal ink jet head are considerably more compact than those of a phase change ink jet head.

U.S. Pat. No. 4,751,528, the disclosure of which is totally incorporated herein by reference, discloses a phase change ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase change ink in a selected zone more rapidly to avoid offset by a pinch roll coming in contact with the surface of the substrate to which phase change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase change inks with an integrally connected ink jet head and reservoir system, the reservoir system including a highly efficient heat conducting plate inserted within an essentially nonheat conducting reservoir housing.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187, in that, for example, the invention vehicle selected displays excellent acoustic loss values at a viscosity of from about 1 to about 20, and preferably 10 centipoise when heated to a temperature of from about 125° C. to about 165° C., such that acoustic energy in the printhead can effectively eject an ink droplet onto paper.

U.S. Pat. No. 5,041,161, the disclosure of which is totally incorporated herein by reference, discloses ink jet ink, which is considered a phase change at room temperature. The inks comprise vehicles, such as acids, aldehydes and mixtures thereof, which phase change at temperatures of from about 20° C. and 45° C.

U.S. Pat. No. 4,853,036 and U.S. Pat. No. 5,124,718 disclose an ink for ink jet recording which comprises a liquid composition essentially comprising a coloring matter, a volatile solvent with a vapor pressure of 1 millimeter Hg or more at 25° C., and a compound being solid at room temperature and having a molecular weight of 300 or more.

U.S. Pat. No. 5,667,568 discloses an ink composition comprised of a colorant and a bisamide with a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly (alkylene oxide)-alkylate, a poly (alkylene oxide)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

The inks of U.S. Pat. No. 5,667,568, based on blends of N'-dodecylbis-stearamide, 95 percent by weight and a colorant selected from Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF), 5 percent by weight and inks of the prior art U.S. Pat. No. 5,698,128 derived from blends of the reaction product of an anhydride and an organoamine, 95 percent by weight and a colorant selected from Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF), 5 percent by weight generally possess hardness values in the range of from about 60 to about 70, viscosities in the range of about 10 to about 15 centipoise and conductivity values in the range of 3.5 to 4.5 log (picomho/cm) compared to preferred viscosities of about 5 to 7 centipoise and preferred conductivity values of about 5 to about 6.5 [log pico.mho/cm] for the inks of the present invention. An advantage of the invention low viscosity and high conductivity inks resides in reduced power consumption by about 35 percent thereby increased printing of from about 25 pages per minute to about 40 pages per minute, improved jettability which refers to the drop size of the ink being uniform all across the print head leading to provide improved ink directionality, that is wherein the velocity of the ink drops has a standard deviation value of from about 3 to about 5 microns and consequently lower edge raggedness of the prints such as a value of about 5 microns and preferably between about 1 to about 3 microns. The edge raggedness refers, for example, to the deviation of the average width of a line measured from the middle of the line to the edge of the line [also known as mid-frequency line-edge noise (MFLN)] and can be measured with an optical microscope.

SUMMARY OF THE INVENTION

While the known ink compositions and processes may be suitable for their intended purposes, a need remains for hard robust conductive acoustic phase change ink compositions suitable for thermal ink jet printing. In addition, there is a need for phase change ink compositions, which are compatible with a wide variety of plain substrates, such as plain papers and yield photographic quality images on coated papers. Further, there is a need for phase change ink compositions, which generate high quality, lightfast, and waterfast images on plain papers. There is also a need for phase change ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for phase change ink jet ink compositions, which exhibit minimal feathering. Additionally, there is a need for phase change ink jet ink compositions, which exhibit minimal intercolor bleed. There is also a need for phase change ink jet ink compositions, which exhibit excellent image permanence. Further, there is a need for phase change ink jet ink compositions, which are suitable for use in acoustic ink jet printing processes. Additionally, there is a need for phase change hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Moreover, there is a need for phase change inks wherein the speculate [spherical ink crystals] size thereof during solidification can be reduced from about 6 to about 9 micrometers to about 2 to about 4 micrometers and to about 1 to about 3 micrometers by crystallinity inhibitors derived, for example, from low viscosity unsaturated aliphatic acid compounds to thereby improve projection efficiency and crease resistance.

DETAILED DESCRIPTION OF THE INVENTION

Aspects of the present invention include an ink composition comprised of (1) a polymer; (2) an acid compound of the formula $CH_3(CH_2)_m(CH_2CH=CH)_p(CH_2)_nCOOH$ wherein n, m, and p represent the number of segments; (3) a conductive component; (4) a lightfastness component; and (5) a colorant; an ink wherein the polymer is poly[(o-cresyl glycidyl ether)-co-formaldehyde], (b) poly[(phenyl glycidyl ether)-co-dicyclopentadiene], or (c) poly(bisphenol A-co-epichlorohydrin), glycidyl end-capped; an ink wherein the colorant is a dye, a pigment, or mixtures thereof; an ink wherein the acid is selected from the group consisting of (1) trans-3-hexenoic acid, (2) trans-2-hexenoic acid, (3) 2-octenoic acid, (4) cis-5-dodecenoic acid, (5) cis-9-tetradecenoic acid, (6) cis-9-hexadecenoic acid, (7) eladic acid, (8) cis-11-eicosenoic acid, (9) cis-13-docosenoic acid, (10) cis-15-tetracosenoic acid, (11) linoleic acid, (12) linolenic acid, (13) cis-8,11,14-eicosatrienoic acid, (14) 5,8,11,14-eicosa tetraenoic acid, and (15) cis-5,8,11,14,17-eicosapentaenoic acid; an ink wherein the polymer is present in an amount of from about 1 to about 98 percent by weight, the acid is present in an amount of from about 59 to about 1 percent by weight, the conductive component is present in an amount of from about 20 to about 0.25 percent by weight, the lightfastness compound is present in an amount of from about 10 to about 0.25 percent by weight, and the colorant is present in an amount of from about 15 to about 0.50 percent by weight, and wherein the total of the these ink components is about 100 percent; an ink wherein the m, p, and n each represent a number of from about zero (0) to about 20; an ink wherein in the acid formula m, p, and n each represent a number of from about 1 to about 10; a conductive ink comprised of (1) a polymeric additive selected from the group consisting of (a) poly[(o-cresyl glycidyl ether)-co-formaldehyde], (b) poly[(phenyl glycidyl ether)-co-dicyclopentadiene], and (c) poly(bisphenol A-co-epichlorohydrin), glycidyl end-capped, (2) an acid compound of the general formula $CH_3(CH_2)_m(CH_2CH=CH)_p(CH_2)_nCOOH$ wherein m, n, and p independently each represent a number of from about 0 to about 15, (3) a conductive compound, (4) a lightfastness component, and (5) a colorant; a conductive ink composition wherein (1) the polymeric additive has a melting point of from about 60° C. to 100° C., and possesses a hardness value of from about 80 to about 95, (2) and the acid, which functions primarily as ink viscosity controlling compound, possesses an acoustic-loss value of from about 15 to about 60 dB/mm; a conductive ink composition and which ink provides developed images with crease values of from about 5 to about 13, haze values of from about 10 to about 15, gloss values of from about 80 to about 90, conductivity values of from about 6 to about 8 [log(pico.mho/cm), and which ink possesses an acoustic-loss value of from about 10 to about 80 dB/mm, and a viscosity of from about 5 centipoise to about 15 centipoise at a temperature of from about 125° C. to about 165° C.; a conductive ink composition wherein the polymer is present in an amount of from about 1 to about 98 percent by weight, the viscosity component is present in an amount of from about 59 to about 1 percent by weight, the conductive component is present in an amount of from about 20 to about 0.25 percent by weight, the lightfastness compound is present in an amount of from about 10 to about 0.25 percent by weight, and the colorant is present in an amount of from about 15 to about 0.50 percent by weight, and wherein the total of these ink components and compounds is about 100 percent; a conductive ink composition wherein the acid contained in the ink is selected from the group consisting of (1) trans-3-hexenoic acid, (2) trans-2-hexenoic acid, (3) 2-octenoic acid, (4) cis-5-dodecenoic acid, (5) cis-9-tetradecenoic acid, (6) cis-9-hexadecenoic acid, (7) eladic acid, (8) cis-1-eicosenoic acid, (9) cis-13-docosenoic acid, (10) cis-15-tetracosenoic acid, (11) linoleic acid, (12) linolenic acid, (13) cis-8,11,14-eicosatrienoic acid, (14) 5,8,11, 14-eicosa tetraenoic acid, and (15) cis-5,8,11,14,17-eicosapentaenoic acid; a conductive ink composition wherein the conductive compound contained in the ink is selected from the group consisting of (1) azidotris (diethylamino) phosphonium bromide, (2) tetrabutylphosphonium chloride, (3) dodecyltriphenylphosphonium bromide, (4) stearyl tributyl phosphonium bromide, (5) trimethylsulfonium methyl sulfate, (6) 3-ethyl-5-(2-hydroxyethyl)-4-methylthiazolium bromide, and (7) 3,4-dimethyl-5-(2-hydroxyethyl) thiazolium iodide; a conductive ink composition wherein the lightfastness component compound contained in the ink is selected from the group consisting of (1) tetrakis (2,4-ditert butyl phenyl)-4,4'-biphenyl diphosphonite, (2) antimony dialkyl phosphoro dithioate, (3) nickel-bis(o-ethyl 3,5-di-tert-butyl-4-hydroxy benzyl) phosphonate, (4) tetra sodium-N-(1,2-dicarboxyethyl)-N-octadecyl sulfosuccinamate, and (5) 2,2,4-trimethyl-1,2-hydroquinoline; a conductive ink composition wherein the polymeric additive compound contained in the ink possesses a melting point of from about 60° C. to about 100° C., and present in an amount of from about 30 to about 90 percent by weight is poly[(o-cresyl glycidyl ether)-co-formaldehyde], or poly(bisphenol A-co-epichlorohydrin), glycidyl end-capped, and wherein the end groups are glycidyl molecules, the acid compound possessing a boiling point of from about 150° C. to about 360° C. and is present in an amount of from about 50 to about 7 percent by weight and is selected from the group consisting of linolenic acid, linoleic acid, trans-2-hexenoic acid, and cis-13-docosenoic acid; the conductive compound contained in the ink is present in an amount of from about 5 to about 1 percent by weight and is selected from the group consisting of stearyltributylphosphonium bromide, and 3-ethyl-5-(2-hydroxyethyl)-4-methyl thiazolium bromide; the lightfastness compound is present in an amount of from about 5 to about 1 percent by weight and is tetrakis (2,4-ditert butyl phenyl)-4,4'-biphenyl diphosphonite, and the colorant is present in an amount of from about 10 to about 1 percent by weight; a printing process which comprises incorporating into an acoustic ink jet printer the ink or inks illustrated herein; a printing process which comprises (a) providing an acoustic ink printer having a pool of the liquid ink of the present invention with a free surface, and a printhead including at least one droplet ejector for radiating the free surface of the ink with focused acoustic radiation to eject individual droplets of ink therefrom on demand, the radiation being brought to focus with a finite waist diameter in a focal plane, and causing droplets of the ink to be ejected in imagewise pattern onto a substrate; an ink wherein the colorant is selected in an amount of from about 0.5 to about 15 percent by weight; an ink wherein the colorant is a pigment, or a dye; an ink wherein the colorant is a pigment of carbon black; an ink wherein the colorant is a cyan, magenta, yellow, black, or mixtures thereof; an ink with a viscosity of from about 5 centipoise to about 20 centipoise, crease values of from about 5 to about 13, haze values of from about 7 to about 12, gloss values of from about 80 to about 90, conductivity values of from about 6 to about 8 [log (pico.mho/cm), and which ink possesses an acoustic-loss value of from about 10 to about 80 dB/mm; an ink with a viscosity of from about 5 centipoise to about 20 centipoise, crease values of from about 5 to about 14, haze values of from about 7 to about 12, gloss values from about 80 to about 85, conductivity values of from about 6 to about 7 [log (pico.mho/cm), and which ink possesses an acoustic-loss value of from about 10 to about 80 dB/mm; an ink wherein the polymer contained therein is a solid and is present in an amount of from about 1 to about 98 percent by weight, the acid is present in an amount of from about 59 to about 1 percent by weight, the conductive component is present in an amount of from about 20 to about 0.25 percent by weight, the lightfastness component is present in an amount of from about 5 to about 0.25 percent by weight, and the colorant is present in an amount of from about 15 to about 0.5 percent by weight; an ink wherein the polymer is a solid present in an amount of from about 30 to about 90 percent by weight, the acid compound is present in an amount of from about 50 to about 7 percent by weight, the conductive component is present in an amount of from about 5 to about 1 percent by weight, the lightfastness component is present in an amount of from about 5 to about 1 percent by weight, and the colorant is present in an amount of from about 10 to about 1 percent by weight; an ink composition comprised of (1) polymer, (2) an acid compound of the formula $CH_3(CH_2)_m(CH_2CH=CH)_p(CH_2)_n COOH$ where m, p and n represent the number of $CH_3(CH_2)$ segments, (3) a conductive component, and (4) a colorant; an ink wherein each of the m, p, and n represent a number of from about 1 to about 100; an ink wherein each of the m, p, and n represent a number of from about 5 to about 25; an ink which is substantially free of water; an ink which contains no water; an ink composition wherein the conductive compound is present in a suitable amount and selected from the group consisting of (1) azidotris (diethylamino) phosphonium bromide, (2) tetrabutylphosphonium chloride, (3) dodecyltriphenylphosphonium bromide, (4) stearyl tributyl phosphonium bromide, (5) trimethylsulfonium methyl sulfate, (6) 3-ethyl-5-(2-hydroxyethyl)-4-methylthiazolium bromide, and (7) 3,4-dimethyl-5-(2-hydroxyethyl) thiazolium iodide; a conductive ink composition wherein the lightfastness component compound present in a suitable amount and is selected from the group consisting of (1) tetrakis (2,4-ditert butyl phenyl)-4,4'-biphenyl diphosphonite, (2) antimony dialkyl phosphoro dithioate, (3) nickel-bis(o-ethyl 3,5-di-tert-butyl-4-hydroxy benzyl) phosphonate, (4) tetra sodium-N-(1,2-dicarboxyethyl)-N-octadecyl sulfosuccinamate, and (5) 2,2,4-trimethyl-1,2-hydroquinoline; an ink wherein the polymer is poly[(o-cresyl glycidyl ether)-co-formaldehyde], (b) poly [(phenyl glycidyl ether)-co-dicyclopentadiene], or (c) poly (bisphenol A-co-epichlorohydrin), glycidyl end-capped; an ink wherein the colorant is a dye, a pigment, or mixtures thereof; an ink wherein the acid contained there in a suitable amount is selected from the group consisting of (1) trans-3-hexenoic acid, (2) trans-2-hexenoic acid, (3) 2-octenoic acid, (4) cis-5-dodecenoic acid, (5) cis-9-tetradecenoic acid, (6) cis-9-hexadecenoic acid, (7) eladic acid, (8) cis-11-eicosenoic acid, (9) cis-13-docosenoic acid, (10) cis-15-tetracosenoic acid, (11) linoleic acid, (12) linolenic acid,

(13) cis-8,11,14-eicosatrienoic acid, (14) 5,8,11,14-eicosa tetraenoic acid, and (15) cis-5,8,11,14,17-eicosapentaenoic acid; an ink wherein the polymer is present in an amount of from about 5 to about 60 percent by weight, the acid is present in an amount of from about 10 to about 30 percent by weight, the conductive component is present in an amount of from about 5 to about 15 percent by weight, the lightfastness compound is present in an amount of from about 0.1 to about 10 percent by weight, and the colorant is present in an amount of from about 1 to about 15 percent by weight, and wherein the total of the ink components and compounds is 100 percent; an ink with a conductivity of from about 6 to about 10 [log(pico.mho/cm); an ink with a conductivity of from about 6 to about 7 [log(pico.mho/cm); an ink with a conductivity of about 7 [log(pico.mho/cm); and acoustic ink composition comprised of (1) a solid polymeric additive that has a hardness value of from about 80 to about 94 with a viscosity of from about 50 to about 2,000 cps and preferably from about 50 to about 500 cps at 150°, such as poly[(o-cresyl glycidyl ether)-co-formaldehyde] [$M_n$=870; Mp=70 to 75° C.; Aldrich #40,551-5; hardness value of 92], or poly[(phenyl glycidyl ether)-co-dicyclopentadiene] [$M_n$=490; Tg=50° C.; Aldrich #41,329-1; hardness value of 90], and the like, and that, for example, can fill and be contained in the pores of the paper, and which polymer has a melting point of lower than about 135° C. and preferably from about 60 to about 100° C., (2) a viscosity modifying compound that can lower the viscosity of ink and bring it to a value of about 10 to about 20 centipoise and selected from the group consisting of centipoise and selected from the group consisting of aliphatic unsaturated acids of the general formula $CH_3(CH_2)_m(CH_2CH=CH)_p(CH_2)_nCOOH$, where m,p,n can independently vary from about 0 to about 15 such as (1) when m=0, p=1 and n=1; trans-3-hexenoic acid, $CH_3(CH_2CH=CH)(CH_2)COOH$, (Aldrich #19,309-7); (2) when m=1, p=1 and n=0; trans-2-hexenoic acid, $CH_3(CH_2)(CH_2CH=CH)COOH$ (Aldrich #19,308-9); (3) when m=3, p=1 and n=0; 2-octenoic acid, $CH_3(CH_2)_3(CH_2CH=CH)COOH$ (Aldrich #28,692-3); and the like, with, for example, a boiling point of higher than about 150° C. (Centigrade) and more specifically having a boiling point from about 150 to about 225° C., with low acoustic loss, which enables a reduction, or minimization of energy consumption, and which acoustic loss is below, or about equal to 60 dB/mm, (3) a conductive phosphorous or sulfur compound, (4) a lightfast antioxidant, (5) and a colorant such as a dye, a pigment or mixtures thereof.

The solid polymeric additive with, for example, a hardness value of from about 80 to about 94, and with a viscosity of from about 50 to about 2,000 cps and preferably from about 50 to about 500 cps at 150° C. include compounds such as poly[(o-cresyl glycidyl ether)-co-formaldehyde] [$M_n$=870; Mp=70 to 75° C.; Aldrich #40,551-5; hardness value of 92], or poly[(phenyl glycidyl ether)-co-dicyclopentadiene] [$M_n$=490; Tg=50° C.; Aldrich #41,329-1; hardness value of 90] with, for example, a melting point of from about 60° C. to about 100° C. and preferably from about 70° C. to about 100° C. is present, for example, in an amount of from about 1 to about 98 percent by weight and preferably from about 30 to about 90 percent by weight, the viscosity modifying acid compound is selected from aliphatic unsaturated acids with an acoustic-loss value of, for example, from about 15 to about 60 dB/mm and is present in the ink composition in an amount of, for example, from 59 to about 1 percent by weight and preferably from about 50 to about 7 percent by weight, the conductive compound is present, for example, in an amount of from about 20 to about 0.25 percent by weight, the lightfastness component is, for example, present in an amount of from about 5 to about 0.25 percent by weight, and the colorant is, for example, present in an amount of from about 15 to about 0.5 percent by weight.

The ink composition contains, for example, the following general range amounts for (1) the polymeric hardener additive, (2) the acid which primarily functions as a viscosity modifier, (3) the conductive compound, (4) the lightfastness compound, and (5) the colorant respectively: [1+59+20+5+15=100] to [98+1+0.25+0.25+0.5=100]. The ink composition contains the following preferred range amounts [30+50+5+5+10=100] to [90+7+1+1+1=100].

In embodiments, the solid polymeric additive that preferably possesses a hardness value of from about 80 to about 93.5 with a viscosity of from about 50 to about 2,000 cps and preferably from about 50 to about 500 cps at 150° C. and with a melting point of from about 70° C. to about 135° C. is present in an amount of from about 30 to about 90 percent by weight, the acid compound with, for example, a boiling point of from about 150° C. to about 225° C. is present in an amount of from about 50 to about 7 percent by weight, the conductive compound is present in an amount of from about 5 to about 1 percent by weight, the lightfastness component is present in an amount of from about 5 to about 1 percent by weight, and the colorant is present in an amount of from about 10 to about 1 percent by weight. These composition ranges, and the others indicated herein were established using a number of known techniques, such as a statistical design based on the analyses of the experimental data of hardness at 25° C., viscosity at 150° C., jettability at 150° C., image quality [high optical density, low crease, high gloss], lightfast, and waterfast values of images generated with various ink compositions.

It is important that the inks of the present invention in embodiment yield images that are tough, that is a preferably hardness value of from about 80 to about 90, durable, for example a crease value of less than about 60 and, for example, from about 5 to about 20 and wherein the inks can withstand the pressures of substrate, such as paper folding such that there is no, or minimal loss of information. The procedure followed to measure crease on images printed with the inks of the present invention is the same as, or similar to the procedures used in the evaluation of xerographic images. The average width of the creased image due to pressure was obtained on colored and black solid area images printed on paper by (a) folding inwards the printed area of the image, (b) passing on the folded image a standard TEFLON coated copper roll 2 inches in width, 3 inches in outer diameter, 2.25 inches in inner diameter and weighing 860 grams, (c) unfolding the paper and wiping the loose toner from the creased imaged surface with a cotton swab, (d) measuring the average width of the ink free creased area with an image analyzer.

Examples of polymeric additives with, for example, a hardness value of from about 80 to about 94, melting points of from about 70° C. to about 135° C. and preferably from about 70° C. to about of 100° C. and present, for example, in an amount of from about 1 to about 98 percent by weight, and preferably in an amount of from about 30 to about 90 percent by weight, include (1) poly[(o-cresyl glycidyl ether)-co-formaldehyde] [$M_n$=870; Mp=70° C. to 75° C.; Aldrich #40,551-5; hardness value of 92]; poly[(o-cresyl glycidyl ether)-co-formaldehyde] [$M_n$=1080; Mp=63° C. to 73° C.; Aldrich #40,804-2]; poly[(o-cresyl glycidyl ether)-co-formaldehyde] [$M_n$=1270; Aldrich #40,803-4]; (2) poly

[(phenyl glycidyl ether)-co-dicyclopentadiene] [$M_n$=490; Tg=50° C.; Aldrich #41,329-1; hardness value of 90], (3) poly(bisphenol A-co-epichlorohydrin), glycidyl end-capped; [$M_n$=1075; hardness value of 93.5; Aldrich #40, 545-0]; poly(bisphenol A-co-epichlorohydrin), glycidyl end-capped; [$M_n$=1750; hardness value of 93.5; Aldrich #40,548-5].

The acid compound, that primarily functions to lower, or modify the viscosity of the inks and which acid possesses a low acoustic loss of from about 15 to about 60 dB/mm, is present in an amount of from about 59 to about 1 percent by weight, and preferably from about 50 to about 7 percent by weight, and is selected from the group consisting of aliphatic unsaturated acids of the general formula (a) $CH_3(CH_2)_m(CH_2CH=CH)_p(CH_2)_nCOOH$ 

where m, p, n can independently vary from, for example, about 0 to about 15 such as (1) when m=0, p=1 and n=1; trans-3-hexenoic acid, $CH_3(CH_2CH=CH)(CH_2)COOH$ (Aldrich #19,309-7); (2) when m=1, p=1 and n=0; trans-2-hexenoic acid, $CH_3(CH_2)(CH_2CH=CH)COOH$ (Aldrich #19,308-9); (3) when m=3, p=1 and n=0; 2-octenoic acid, $CH_3(CH_2)_3(CH_2CH=CH)$ COOH (Aldrich #28,692-3); (4) when m=4, p=1 and n=3; cis-5-dodecenoic acid, $CH_3(CH_2)_4(CH_2CH=CH)(CH_2)_3COOH$ (Aldrich #44,502-9); (5) when m=2, p=1 and n=7; cis-9-tetradecenoic acid, $CH_3(CH_2)_2(CH_2CH=CH)(CH_2)_7COOH$ (Aldrich #28,673-7); (6) when m=4, p=1 and n=7; cis-9-hexadecenoic acid, $CH_3(CH_2)_4(CH_2CH=CH)(CH_2)_7COOH$ (Aldrich #28, 692-3); (7) when m=6, p=1 and n=7; eladic acid $CH_3(CH_2)_6(CH_2CH=CH)(CH_2)_7COOH$, (Aldrich #E30-4); (8) when m=6, p=1 and n=9; cis-11-eicosenoic acid, $CH_3(CH_2)_6(CH_2CH=CH)(CH_2)_9COOH$ (Aldrich #28,571-4); (9) when m=6, p=1 and n=11; cis-13-docosenoic acid $CH_3(CH_2)_6(CH_2CH=CH)(CH_2)_{11}$ COOH (Aldrich #85,843-9); (10) when m=6, p=1 and n=13; cis-15-tetracosenoic acid, $CH_3(CH_2)_6(CH_2CH=CH)(CH_2)_{13}COOH$, (Aldrich #28, 682-6); (11) when m=3, p=2 and n=7; linoleic acid, $CH_3(CH_2)_3(CH_2CH=CH)_2(CH_2)_7COOH$, (Aldrich #27,154-3); (12) when m=0, p=3 and n=6; linolenic acid, $CH_3(CH_2CH=CH)_3(CH_2)_7COOH$, (Aldrich #85,601-0); (13) when m=3, p=3 and n=6; cis-8,11,14-eicosatrienoic acid, $CH_3(CH_2)_3(CH_2CH=CH)_3(CH_2)_6COOH$, (Aldrich #27, 154-3); (14) when m=3, p=4 and n=3 5,8,11,14-eicosa tetraenoic acid, $CH_3(CH_2)_3(CH_2CH=CH)_4(CH_2)_3COOH$, (Aldrich #23,384-63); (15) when m=0, p=5 and n=3 cis-5, 8,11,14,17-eicosapentaenoic acid, $CH_3(CH_2CH=CH)_5(CH_2)_3COOH$, (Aldrich #27,785-1); and mixtures thereof in various proportions.

The conductive compounds that impart conductivity to the ink composition include phosphorous compounds such as (A) (1) azidotris (diethylamino) phosphonium bromide, (Aldrich #30,082-2), (2) tetrabutyl phosphonium chloride, (Aldrich #14,480-0), (3) dodecyltriphenyl phosphonium bromide, (Aldrich #17,262-6), (4) stearyltributyl phosphonium bromide, (Aldrich #29,303-2) and sulfur compounds such as (1) trimethylsulfonium methyl sulfate, (Aldrich #30,359-3), (2) 3-ethyl-5-(2-hydroxyethyl)-4-methylthiazolium bromide, (Aldrich #33,124-4); (3) 3,4-dimethyl-5-(2-hydroxyethyl)thiazolium iodide, (Aldrich #25,782-6), and the like.

Lightfastness, compounds that primarily protect the developed images from sunlight and present in the ink composition in an amount of, for example, from about 0.25 to about 10 percent by weight and preferably from about 1 to about 5 percent by weight include, for example, (1) tetrakis (2,4-ditert butyl phenyl)-4,4'-biphenyl diphosphonite, (Aldrich #46,852-5, hardness value 90), (2) antimony dialkyl phosphoro dithioate, Vanderbilt Corporation, (3) nickel-bis(o-ethyl 3,5-di-tert-butyl-4-hydroxy benzyl) phosphonate, Ciba Geigy Corporation, (4) tetra sodium-N-(1,2-dicarboxyethyl)-N-octadecyl sulfosuccinamate, American Cyanamid Corporation, (5) 2,2, 4-trimethyl-1,2-hydroquinoline, Mobay Corporation.

Suitable colorants present in the ink composition in amounts of, for example, of from about 0.5 to about 20 percent by weight and preferably from about 1 to about 15 percent by weight, include pigments and dyes, with solvent dyes being preferred. Any suitable dye or pigment may be selected, providing, for example, that it is preferably capable of being dispersed or dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan m (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330® (Cabot), Carbon Black 5250, Carbon Black 5750 (Columbia Chemical Company).

Dye examples are Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.;

Carodirect Yellow RL (Direct Yellow 86), available from Carolina Color and Chemical; Cartasol Yellow GTF Liquid Special 110, available from Sandoz, Inc.; D&C Yellow # 10 (Acid Yellow 3), available from Tricon; Yellow Shade 16948, available from Tricon; Basacid Black X34, available from BASF; Carta Black 2GT, available from Sandoz, Inc.; and the like.

Particularly preferred are solvent dyes, and within the class of solvent dyes, spirit soluble dyes are preferred because of their compatibility with the vehicles and dye leveling compounds of the present application. Dye examples are Neozapon Red 492 (BASF), Orasol Red G (Ciba-Geigy), Direct Brilliant Pink B (Crompton-Knolls), Aizen Spilon Red C-BH (Hodogaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodogaya Chemical Company), Sirius Supra Yellow GD 167,Cartasol Brilliant Yellow 4GF (Sandoz), Pergasol Yellow CGP (Ciba-Geigy), Orasol Black RLP(Ciba-Geigy), Savinyl Black RLS (Sandoz), Dermacarbon 2GT(Sandoz), Pyrazol Black BG (ICI), Morfast Black Conc. A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like. Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] (BASF) are preferred.

The polymeric additive such as poly[(o-cresyl glycidyl ether)-co-formaldehyde], conductive compounds such as stearyltributylphosphonium bromide, acid compounds such as, linoleic acid, the lightfastness compound such as tetrakis (2,4-ditert butyl phenyl)-4,4'-biphenyl diphosphonite, used in the phase change inks are preferably crystalline or semi-crystalline in the solid state. A material is considered crystalline when it is comprised of crystals with a regular arrangement of its atoms in the space lattice. When this arrangement of atoms in the space lattice is irregular the material is considered amorphous. The state of part of the structure being crystalline and another part amorphous is referred to as semicrystalline. When solidified on a substrate such as paper or transparency the phase change ink materials can crystallize in a spherulitic morphology, and wherein the size of the spherules is preferably, for example, from about 0.1 to about 10 microns, and preferably from about 1 and about 4 microns, for optimum projection efficiency. The ink opacity increases with the size of the spherulites. The spherulite size can be measured by an optical microscope with cross polarized light or by the low angle solid state light scattering method (R. S. Stein and M. B. Rhodes, *J. Appl. Phys.*, 31, 1873 (1960)). The latter provides an average size from the sample. A monochromatic, vertically polarized light is passed through the sample. The scattered light is analyzed with another nicol prism, with its optic axis horizontal. This is conventionally known as the $H_v$ scattering method. The spherulite size is measured from the location of the maximum intensity in the four-leaf clover scattering pattern. Large spherulites, of a size greater than about 5 microns, could result in brittle prints. It is also a feature of the present invention to control the size of the spherulites, by formulating ternary blends of the polymeric compound present in an amount of from about 30 to about 90 percent by weight, the viscosity modifying acid compound having a boiling point of from about 150 to about 225° C. present in an amount of from about 50 to about 7 percent by weight, and the conductive compound present in an amount of from about 15 to about 1 percent by weight. Furthermore, the composition of a polymeric additive, conductive compound, acid compound, and lightfast compound when solidified, blend forms a dispersed phase of small spherulitic crystalline domains in the matrix of each other. This morphology of reduced spherulitic size of from about 6 to about 9 micrometers to about 0.5 to about 3, and more preferably from about 0.5 to about 1 micrometer measured with an optical microscope not only improves the projection efficiency, but also increases the crease resistance. Inks with the spherulite size of from about 0.5 to 1 micrometer are ideal as these scatter minimum of light thereby improving projection efficiency when printed on transparencies. The resistance to creasing is also increased with reduced spherulite size because of better intra molecular bonding from about the ink molecules.

The inks of the present invention can be prepared by any suitable method, such as the simple mixing and heating of the ink components. For example, the ink can be prepared by mixing about 35 percent by weight of the polymeric additive with a hardness value of from about 80 to about 93.5; 35 percent by weight of the acid compound, 20 percent by weight of the conductive quaternary phosphorous or sulfur compound with, for example, a melting point of from about 80° C. to about 120° C.; 5 percent by weight of the lightfastness compound and 5 percent by weight of a colorant. The resulting mixture can then be heated to a temperature of about 120° C. and stirred for a suitable period of time, for example about 60 minutes until there is formed a homogeneous solution, and subsequently the mixture can be cooled to about 25° C.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. More specifically, the inks of the present invention are suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin,* Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is an important design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

Acoustic-loss measurements recited herein were measured as follows: samples of the compound being measured were placed in contact with two transducers, with the temperature set at 150° C. The samples weighing about 100 milligrams were permitted to equilibrate at 150° C. for five minutes. The two transducers were brought together to maximize the acoustic signal. The amplitude and the position of the signals were recorded. The two transducers were separated by a distance varying from about 25.4 microns to about 125.4 microns recording each time the amplitude and the position of the signal. Each measurement was performed three times and three samples of the same material. The attenuation dB/mm was then calculated by ratioing the amplitude values obtained at different separation distances.

The optical density values of the inks, such as with Black [Neozapon Black X51 C.I. #12195] from about, for example, 2.1 to about 2.3, Cyan [Sudan Blue 670] C.I. #61554] from about 1.80 to about 1.85, Magenta Sudan Red 462 [C.I. #26050], from about 1.90 to about 1.95 and yellow [Sudan Yellow 146 C.I. #12700 from about 1.37 to about 1.45, recited herein were obtained on a Pacific Spectrograph Color System. The system is comprised of two major components, an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from about 380 to about 720 nanometers. The data terminal features a 12 inch CRT display, numerical keyboard for selection of operating parameters and the entry of tristimulus values, and an alphanumeric keyboard for entry of product standard information. The conductivity values expressed as log(pico.mho/cm) and recited herein were measured under melt conditions at 150° C. by placing an aluminum electrode in the melt and reading the resistivity output on a GenRad 1689 precision RLC Digibridge at a frequency of 1 K.Hz. Conductivity is calculated from the resistivity data; the lightfastness values of ink jet images generated with the invention inks are, for example, from about 90 to 100 percent and preferably from about 95 to about 100 percent and which lightfastness was measured in the Mark V Lightfast Tester obtained from Microscal Company, London, England; and the waterfast values of the ink jet images were obtained from the optical density data recorded before and after washing with water at 25° C. for 5 minutes.

The viscosity values recited herein were measured at 150° C. with a Stress Rheometer from Cari-Med, model CSL 100. All experiments were performed at a shear rate of 1,250 s$^{-1}$.

The average width of the creased image due to pressure was obtained on colored and black solid area images printed on paper by (a) folding inwards the printed area of the image, (b) passing on the folded image a standard TEFLON coated copper roll 2 inches in width, 3 inches in outer diameter, 2.25 inches in inner diameter and weighing 860 grams, (c) unfolding the paper and wiping the loose toner from the creased imaged surface with a cotton swab, and (d) measuring the average width of the toner free creased area with an image analyzer.

The haze values of images, for example from about 10 to about 30 and preferably from about 10 to about 20 recited herein were measured on images printed on uncoated poly-

EXAMPLE I

A black phase change ink composition was prepared by mixing 35 percent by weight of the polymeric additive poly[(o-cresyl glycidyl ether)-co-formaldehyde] [$M_n$=870; Mp=70° C. to 75° C.; Aldrich #40,551-5 and with a hardness value of 92; 35 percent by weight of the viscosity modifying compound linolenic acid, $CH_3(CH_2CH=CH)_3(CH_2)_7COOH$, (Aldrich #85,601-0) with an acoustic-loss value of 25 dB/mm, and a boiling point of 232° C.; 20 percent by weight of the conductive quaternary compound stearyltributylphosphonium bromide (Aldrich #29,303-2) with a melting point of 72° C., an acoustic-loss value of 29 dB/mm and a conductivity of 6.8[log(pico.mho/cm)]; 5 percent by weight of the lightfastness compound tetrakis (2,4-ditert butyl phenyl)-4,4'-biphenyl diphosphonite, (Aldrich #46,852-5, hardness value 90), and 5 percent by weight of the colorant Neozapon Black X51 [C.I. Solvent Black; C.I. #12195] (BASF). The mixture resulting was heated to a temperature of about 120° C. and stirred for a period of about 60 minutes until it formed a homogeneous solution, and subsequently the solution was cooled to 25° C. The resulting black ink comprised of the hardener poly[(o-cresyl glycidyl ether)-co-formaldehyde], 35 percent by weight; the viscosity linolenic acid modifier, 35 percent by weight; the conductive compound stearyltributylphosphonium bromide, 20 percent by weight; the lightfastness compound tetrakis (2,4-ditert butyl phenyl)-4,4'-biphenyl diphosphonite, 5 percent by weight; the colorant Neozapon Black X51, 5 percent by weight; possessed a hardness value of 83.5 at 23° C., an acoustic loss value of 50 dB/mm, a viscosity of 10.5 cps at 150° C., and a conductivity of 6.5 [log(pico.mho/cm)] at 150° C.

EXAMPLE II

A blue phase change ink composition was prepared by mixing 35 percent by weight of the polymeric additive poly[(o-cresyl glycidyl ether)-co-formaldehyde] [$M_n$=870; Mp=70 to 75° C. obtained from Aldrich #40,551-5 and with a hardness value of 92]; 35 percent by weight of linoleic acid, $CH_3(CH_2)_3(CH_2CH=CH)_2(CH_2)_7COOH$, (Aldrich #27,154-3) having an acoustic-loss value of 26 dB/mm, and a boiling point of 230° C.; 20 percent by weight of the conductive quaternary compound stearyltributylphosphonium bromide, (Aldrich #29,303-2) having a melting point of 72° C., an acoustic-loss value of 29dB/mm and conductivity of 6.8 [log(pico.mho/cm)]; 5 percent by weight of the lightfastness compound tetrakis(2,4-ditert butyl phenyl)-4,4'-biphenyl diphosphonite (Aldrich #46,852-5, hardness value 90), and 5 percent by weight of the colorant Sudan Blue 670 [C.I. #61554] (BASF). The mixture resulting was heated to a temperature of about 120° C. and stirred for a period of about 60 minutes until it formed a homogeneous solution, and the solution was subsequently cooled to 25° C. The resulting blue ink comprised of the hardener poly[(o-cresyl glycidyl ether)-co-formaldehyde], 35 percent by weight; linoleic acid, 35 percent by weight; the conductive compound stearyltributylphosphonium bromide, 20 percent by weight; the lightfastness compound tetrakis (2,4-ditert butyl phenyl)-4,4'-biphenyl diphosphonite, 5 percent by weight; and the colorant Sudan Blue 670, 5 percent by weight possessed a hardness value of 83 at 23° C., an acoustic loss value of 51 dB/mm, a viscosity of 10.7 cps (centipoise), and a conductivity of 6.0 [log(pico.mho/cm)] at 150° C.

EXAMPLE III

A yellow phase change ink composition was prepared by mixing 35 percent by weight of the polymer poly[(o-cresyl glycidyl ether)-co-formaldehyde] [$M_n$=870; Mp=70 to 75° C. obtained from Aldrich #40,551-5 and with a hardness value of 92; 35 percent by weight of trans-2-hexenoic acid, $CH_3(CH_2)(CH_2CH=CH)COOH$ (Aldrich #19,308-9) having an acoustic-loss value of 24 dB/mm, and a boiling point of 217° C.; 20 percent by weight of the conductive quaternary compound stearyltributylphosphonium bromide, (Aldrich #29,303-2) having a melting point of 72° C., an acoustic-loss value of 29 dB/mm, and a conductivity of 6.8 [log(pico.mho/cm)]; 5 percent by weight of the lightfastness compound tetrakis(2,4-ditert butyl phenyl)-4,4'-biphenyl diphosphonite, (Aldrich #46,852-5, hardness value 90), and 5 percent by weight of the colorant Sudan Yellow 146 [C.I. #12700] (BASF). The mixture resulting was heated to a temperature of about 100° C. and stirred for a period of about 60 minutes until it formed a homogeneous solution, and subsequently the solution was cooled to 25° C. The resulting yellow ink comprised of the hardener poly[(o-cresyl glycidyl ether)-co-formaldehyde], 35 percent by weight; the viscosity modifier trans-2-hexenoic acid, 35 percent by weight; the conductive compound stearyl tributylphosphonium bromide, 20 percent by weight; the lightfast compound tetrakis (2,4-ditert butyl phenyl)-4,4'-biphenyl diphosphonite, 5 percent by weight; and the colorant Sudan Yellow 146, 5 percent by weight; had hardness value of 82.5 at 23° C., an acoustic loss value of 51 dB/mm, a viscosity of 10.7 cps, and a conductivity of 6.0 [log(pico.mho/cm)] at 150° C.

EXAMPLE IV

A red phase change ink composition was prepared by mixing 35 percent by weight of the polymer poly[(o-cresyl glycidyl ether)-co-formaldehyde] [$M_n$=870; Mp=70 to 75° C. Aldrich #40,551-5 and with a hardness value of 92; 35 percent by weight of cis-13-docosenoic acid $CH_3(CH_2)_6(CH_2CH=CH)(CH_2)_{11}COOH$ (Aldrich #85,843-9); having an acoustic-loss value of 34 dB/mm, and a boiling point of 217° C.; 20 percent by weight of the conductive quaternary compound stearyltributylphosphonium bromide, (Aldrich #29,303-2) having a melting point of 72° C., an acoustic-loss value of 29 dB/mm and a conductivity of 6.8 [log(pico.mho/cm)]; 5 percent by weight of the lightfastness compound tetrakis (2,4-ditert butyl phenyl)-4,4'-biphenyl diphosphonite, (Aldrich #46,852-5, hardness value 90), and 5 percent by weight of the colorant Sudan Red 462 [C.I. #26050] (BASF). The mixture resulting was heated to a temperature of about 120° C. and stirred for a period of about 60 minutes until it formed a homogeneous solution, and subsequently the solution was cooled to 25° C. The resulting red ink was comprised of poly[(o-cresyl glycidyl ether)-co-formaldehyde], 35 percent by weight; cis-13-docosenoic acid, 35 percent by weight of the conductive compound stearyl tributylphosphonium bromide, 20 percent by weight; the lightfastness compound tetrakis (2,4-ditert butyl phenyl)-4,4'-biphenyl diphosphonite, 5 percent by weight; and the colorant Sudan Red 462, 5 percent by weight. This ink had a hardness value of 82 at 23° C., an acoustic loss value of 51 dB/mm, a viscosity of 10.7 cps, and a conductivity of 6.0 [log(pico.mho/cm)] at 150° C.

Each of the above prepared four inks was incorporated into an acoustic ink jet printer as disclosed in U.S. Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors were acoustically coupled to the ink via the carrier, and their output focal plane was essentially coplanar with the free surface of the liquefied ink, thereby enabling them to eject individual droplets of ink therefrom on command. The inks were moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element was provided for liquefying the ink, and the lower surface of the carrier was coated with a thin layer of electrically resistive material for liquefying the ink by localized resistive heating. A jetting frequency of 160 MHz was used to generate drops of about 2 picoliters, up to 12 drops per pixel at 600 spi. The images formed on paper exhibited excellent color quality with hardness values of 82.5±1 at 23° C. and with equivalent optical density values of about 2.45 (black), 1.95 (cyan), 2.15 (magenta), 1.55 (yellow), and with crease values of 9 (black), 7 (magenta), 7 (cyan), 5 (yellow), gloss values of 85 (black), 82 (magenta), 82 (cyan), 80 (yellow), ink spherulite radius of from about 1 to 2 micrometer and which size enables haze values of 11 (black), 9 (magenta), 8 (cyan), 6 (yellow), when printed on transparencies.

EXAMPLE V

A black phase change ink composition was prepared by mixing 25 percent by weight of the polymer poly(bisphenol A-co-epichlorohydrin), glycidyl end-capped; [$M_n$=1075; hardness value of 93.5 obtained from Aldrich #40,545-0]; 45 percent by weight of linolenic acid, $CH_3(CH_2CH=CH)_3$ $(CH_2)_7COOH$, (Aldrich #85,601-0) with an acoustic-loss value of 25 dB/mm and a boiling point of 232° C.; 20 percent by weight of the conductive quaternary compound 3-ethyl-5-(2-hydroxyethyl)-4-methyl thiazolium bromide, (Aldrich #33,124-4) with a melting point of 85° C., an acoustic-loss value of 33 dB/mm and a conductivity of 6.6 [log(pico.mho/cm)]; 5 percent by weight of the lightfastness compound tetrakis(2,4-ditert butyl phenyl)-4,'-biphenyl diphosphonite, (Aldrich #46,852-5, hardness value 90), and 5 percent by weight of the colorant Neozapon Black X51 [C.I. Solvent Black; C.I. #12195] (BASF). The mixture resulting was heated to a temperature of about 120° C. and stirred for a period of about 60 minutes until it formed a homogeneous solution, and subsequently the solution was cooled to 25° C. The resulting black ink comprised of poly(bisphenol A-co-epichlorohydrin), glycidyl end-capped, 25 percent by weight; linolenic acid 45 percent by weight; the conductive compound 3-ethyl-5-(2-hydroxyethyl)-4-methyl thiazolium bromide, 20 percent by weight; the lightfastness compound tetrakis (2,4-ditert butyl phenyl)-4,4'-biphenyl diphosphonite, 5 percent by weight, and colorant Neozapon Black X51, 5 percent by weight, possessed a hardness value of 84 at 23° C., an acoustic loss value of 55 dB/mm, a viscosity of 13.5 cps, and a conductivity of 6.5 [log(pico.mho/cm)] at 150° C.

EXAMPLE VI

A blue phase change ink composition was prepared by mixing 25 percent by weight of the polymeric additive poly(bisphenol A-co-epichlorohydrin), glycidyl end-capped; [$M_n$=1075; hardness value of 93.5; Aldrich #40, 545-0]; 45 percent by weight of linoleic acid, $CH_3(CH_2)_3$ $(CH_2CH=CH)_2(CH_2)_7COOH$, (Aldrich #27,154-3) having an acoustic-loss value of 26 dB/mm and a boiling point of 230° C.; 20 percent by weight of the conductive quaternary compound 3-ethyl-5-(2-hydroxyethyl)-4-methyl thiazolium bromide, (Aldrich #33,124-4) with a melting point of 85° C., an acoustic-loss value of 33 dB/mm and a conductivity of 6.6 [log(pico.mho/cm)]; 5 percent by weight of the lightfast compound tetrakis(2,4-ditert butyl phenyl)-4,4'-biphenyl diphosphonite, (Aldrich #46,852-5 hardness value 90), and 5 percent by weight of the colorant Sudan Blue 670 [C.I. #61554] (BASF). The mixture resulting was heated to a temperature of about 120° C. and stirred for a period of about 60 minutes until it formed a homogeneous solution, and the solution was subsequently cooled to 25° C. The resulting blue ink comprised of poly(bisphenol A-co-epichlorohydrin), glycidyl end-capped, 25 percent by weight of the linoleic acid, 45 percent by weight; the conductive compound 3-ethyl-5-(2-hydroxyethyl)-4-methyl thiazolium bromide 20 percent by weight; the lightfastness compound tetrakis(2,4-ditert butyl phenyl)-4,4'-biphenyl diphosphonite, 5 percent by weight; and the colorant Sudan Blue 670, 5 percent by weight, possessed a hardness value of 83 at 23° C., an acoustic loss value of 53 dB/mm, a viscosity of 13.5 cps and a conductivity of 6.0 [log (pico.mho/cm)] at 150° C.

EXAMPLE VII

A yellow phase change ink composition was prepared by mixing 25 percent by weight of poly(bisphenol A-co-epichlorohydrin), glycidyl end-capped; [$M_n$=1075; hardness value of 93.5; Aldrich #40,545-0]; 45 percent by weight of trans-2-hexenoic acid, $CH_3(CH_2)(CH_2CH=CH)COOH$ (Aldrich #19,308-9) with an acoustic-loss value of 24 dB/mm and a boiling point of 217° C.; 20 percent by weight of the conductive quaternary compound 3-ethyl-5-(2-hydroxyethyl)-4-methyl thiazolium bromide, (Aldrich #33, 124-4) with a melting point of 85° C., an acoustic-loss value of 33 dB/mm and a conductivity of 6.6 [log(pico.mho/cm)]; 5 percent by weight of the lightfast compound tetrakis(2,4-ditert butyl phenyl)-4,4'-biphenyl diphosphonite, (Aldrich #46,852-5 a hardness value 90), and 5 percent by weight of the colorant Sudan Yellow 146 [C.I. #12700] (BASF). The mixture resulting was heated to a temperature of about 100° C. and stirred for a period of about 60 minutes until it formed a homogeneous solution, and subsequently the solution was cooled to 25° C. The resulting yellow ink comprised of poly(bisphenol A-co-epichlorohydrin), glycidyl end-capped, 25 percent by weight; trans-2-hexenoic acid 45 percent by weight; the conductive compound 3-ethyl-5-(2-hydroxyethyl)-4-methyl thiazolium bromide 20 percent by weight; the lightfastness compound tetrakis (2,4-ditert butyl phenyl)-4,4'-biphenyl diphosphonite, 5 percent by weight; and the colorant Sudan Yellow 146, 5 percent by weight, possessed a hardness value of 83 at 23° C., an acoustic loss value of 53 dB/mm, and a viscosity of 13.5 cps, and a conductivity of 6.0 [log(pico.mho/cm)] at 150° C.

EXAMPLE VIII

A red phase change ink composition was prepared by mixing 25 percent by weight of poly(bisphenol A-co-epichlorohydrin), glycidyl end-capped; [$M_n$=1075; hardness value of 93.5; Aldrich #40,545-0]; 45 percent by weight of cis-13-docosenoic acid $CH_3(CH_2)_6(CH_2CH=CH)(CH_2)$ $_{11}$COOH (Aldrich #85,843-9); having an acoustic-loss value of 34 dB/mm, and a boiling point of 217° C.; 20 percent by weight of the conductive quaternary compound 3-ethyl-5-(2-hydroxyethyl)-4-methyl thiazolium bromide, (Aldrich #33,124-4), with a melting point of 85° C., an acoustic-loss value of 33 dB/mm and a conductivity of 6.6 [log(pico.mho/cm)]; 5 percent by weight of the lightfastness compound tetrakis(2,4-ditert butyl phenyl)-4,4'-biphenyl diphosphonite, (Aldrich #46,852-5, hardness value 90), and 5 percent by weight of the colorant Sudan Red 462 [C.I. #26050] (BASF). The mixture resulting was heated to a temperature of about 120° C. and stirred for a period of about 60 minutes until it formed a homogeneous solution, and subsequently, the solution was cooled to 25° C. The resulting red ink comprised of the hardener poly(bisphenol A-co-epichlorohydrin), glycidyl end-capped, 25 percent by weight; the viscosity modifier cis-13-docosenoic acid, 45 percent by weight; the conductive compound 3-ethyl-5-(2-hydroxyethyl)-4-methyl thiazolium bromide, 20 percent by weight; the lightfast compound tetrakis(2,4-ditert butyl phenyl)-4,4'-biphenyl diphosphonite, 5 percent by weight; the colorant Sudan Red 462, 5 percent by weight; possessed a hardness value of 83 at 23° C. and an acoustic loss value of 55 dB/mm, a viscosity of 14.5 cps, and a conductivity of 6.0 [log(pico.mho/cm)] at 150° C.

Each of the above prepared four inks was incorporated into an acoustic ink jet printer as disclosed in U.S. Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors were acoustically coupled to the ink via the carrier, and their output focal plane was essentially coplanar with the free surface of the liquefied ink, thereby enabling them to eject individual droplets of ink therefrom on command. The inks were moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element was provided for liquefying the ink, and the lower surface of the carrier was coated with a thin layer of electrically resistive material for liquefying the ink by localized resistive heating. A jetting frequency of 160 MHz was used to generate drops of about 2 picoliters, up to 12 drops per pixel at 600 spi. The images formed on paper exhibited excellent color quality with hardness values of 83±1 at 23° C. and with equivalent optical density values of about 2.55 (black), 2.05 (cyan), 2.15 (magenta), 1.505 (yellow), and with crease values of 12 (black), 9 (magenta), 7 (cyan), 5 (yellow), gloss values of 85 (black), 83 (magenta), 82 (cyan), 80 (yellow), ink spherulite radius of from about 1 to 2 micrometer leading to haze values of 13 (black), 11 (magenta), 9 (cyan), 7 (yellow) when printed on transparencies.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a polymer; (2) an acid compound of the formula $CH_3(CH_2)_m(CH_2CH=CH)_p(CH_2)_nCOOH$ wherein n, m, and p represent the number of segments; (3) a conductive component; (4) a lightfastness component; and (5) a colorant, and wherein said polymer is (a) poly[(o-cresyl glycidyl ether)-co-formaldehyde], (b) poly[(phenyl glycidyl ether)-co-dicyclopentadiene], or (c) poly(bisphenol A-co-epichlorohydrin), glycidyl end-capped.

2. An ink in accordance with claim 1 wherein said colorant is a dye, a pigment, or mixtures thereof.

3. An ink in accordance with claim 1 wherein said acid is selected from the group consisting of (1) trans-3-hexenoic acid, (2) trans-2-hexenoic acid, (3) 2-octenoic acid, (4) cis-5-dodecenoic acid, (5) cis-9-tetradecenoic acid, (6) cis-9-hexadecenoic acid, (7) eladic acid, (8) cis-11-eicosenoic acid, (9) cis-13-docosenoic acid, (10) cis-15-tetracosenoic acid, (11) linoleic acid, (12) linolenic acid, (13) cis-8,11,14-eicosatrienoic acid, (14) 5,8,11,14-eicosa tetraenoic acid, and (15) cis-5,8,11,14,17-eicosapentaenoic acid.

4. An ink in accordance with claim 1 wherein the polymer is present in an amount of from about 1 to about 98 percent by weight, the acid is present in an amount of from about 59 to about 1 percent by weight, the conductive component is present in an amount of from about 20 to about 0.25 percent by weight, the lightfastness compound is present in an amount of from about 10 to about 0.25 percent by weight, and the colorant is present in an amount of from about 15 to about 0.50 percent by weight, and wherein the total of said ink components is about 100 percent.

5. An ink in accordance with claim 1 wherein said m, p, and n each represent a number of from about zero (0) to about 20.

6. An ink in accordance with claim 1 wherein said m, p, and n each represent a number of from about 1 to about 10.

7. A printing process which comprises (a) providing an acoustic ink printer having a pool of the liquid ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

8. An ink in accordance with claim 1 wherein the colorant is selected in an amount of from about 0.5 to about 15 percent by weight.

9. An ink in accordance with claim 1 wherein the colorant is a pigment, or a dye.

10. An ink in accordance with claim 1 wherein the colorant is a pigment of carbon black.

11. An ink in accordance with claim 1 wherein the colorant is a cyan, magenta, yellow, black, or mixtures thereof.

12. An ink in accordance with claim 1 with a viscosity of from about 5 centipoise to about 20 centipoise, crease values of from about 5 to about 13, haze values of from about 7 to about 12, gloss values of from about 80 to about 90, conductivity values of from about 6 to about 8 [log (pico.mho/cm), and which ink possesses an acoustic-loss value of from about 10 to about 80 dB/mm.

13. An ink in accordance with claim 1 wherein said polymer is a solid and is present in an amount of from about 1 to about 98 percent by weight, the acid is present in an amount of from about 59 to about 1 percent by weight, the conductive component is present in an amount of from about 20 to about 0.25 percent by weight, the lightfastness component is present in an amount of from about 5 to about 0.25 percent by weight, and the colorant is present in an amount of from about 15 to about 0.5 percent by weight.

14. An ink in accordance with claim 1 wherein each of said m, p, and n represent a number of from about 1 to about 100.

15. An ink composition in accordance with claim 1 wherein said conductive compound is selected from the group consisting of (1) azidotris (diethylamino) phosphonium bromide, (2) tetrabutylphosphonium chloride, (3) dodecyltriphenylphosphonium bromide, (4) stearyl tributyl phosphonium bromide, (5) trimethylsulfonium methyl sulfate, (6) 3-ethyl-5-(2-hydroxyethyl)-4-methylthiazolium bromide, and (7) 3,4-dimethyl-5-(2-hydroxyethyl) thiazolium iodide.

16. A conductive ink composition in accordance with claim 1 wherein said lightfastness component compound is selected from the group consisting of (1) tetrakis (2,4-ditert butyl phenyl)-4,4'-biphenyl diphosphonite, (2) antimony dialkyl phosphoro dithioate, (3) nickel-bis(o-ethyl 3,5-di-tert-butyl-4-hydroxy benzyl) phosphonate, (4) tetra sodium-N-(1,2-dicarboxyethyl)-N-octadecyl sulfosuccinamate, and (5) 2,2,4-trimethyl-1,2-hydroquinoline.

17. An ink in accordance with claim 1 with a conductivity of from about 6 to about 10 (log(pico.mho/cm).

18. An ink in accordance with claim 1 with a conductivity of from about 6 to about 7 [log(pico.mho/cm).

19. An ink in accordance with claim 1 with a conductivity of about 7 [log(pico.mho/cm).

20. A conductive ink comprised of (1) a polymeric additive selected from the group consisting of (a) poly[(o-cresyl glycidyl ether)-co-formaldehyde], (b) poly[(phenyl glycidyl ether)-co-dicyclopentadiene], and (c) poly(bisphenol A-co-epichlorohydrin), glycidyl end-capped, (2) an acid compound of the general formula $CH_3(CH_2)_m(CH_2CH=CH)_p(CH_2)_nCOOH$ wherein m, n, and p independently each represent a number of from about 0 to about 15, (3) a conductive compound, (4) a lightfastness component, and (5) a colorant.

21. A conductive ink composition in accordance with claim 20 wherein (1) said polymeric additive has a melting point of from about 60° C. to 100° C., and possesses a hardness value of from about 80 to about 95, (2) and said acid, which functions primarily as ink viscosity controlling compound, possesses an acoustic-loss value of from about 15 to about 60 dB/mm.

22. A conductive ink composition in accordance with claim 20 and which ink provides developed images with crease values of from about 5 to about 13, haze values of from about 10 to about 15, gloss values of from about 80 to about 90, conductivity values of from about 6 to about 8 [log(pico.mho/cm), and which ink possesses an acoustic-loss value of from about 10 to about 80 dB/mm, and a viscosity of from about 5 centipoise to about 15 centipoise at a temperature of from about 125° C. to about 165° C.

23. A conductive ink composition in accordance with claim 20 wherein the polymer is present in an amount of from about 1 to about 98 percent by weight, the acid is present in an amount of from about 59 to about 1 percent by weight, the conductive component is present in an amount of from about 20 to about 0.25 percent by weight, the lightfastness compound is present in an amount of from about 10 to about 0.25 percent by weight, and the colorant is present in an amount of from about 15 to about 0.50 percent by weight, and wherein the total of said ink components and compounds is about 100 percent.

24. A conductive ink composition in accordance with claim 20 wherein said acid is selected from the group consisting of (1) trans-3-hexenoic acid, (2) trans-2-hexenoic acid, (3) 2-octenoic acid, (4) cis-5-dodecenoic acid, (5) cis-9-tetradecenoic acid, (6) cis-9-hexadecenoic acid, (7) eladic acid, (8) cis-11-eicosenoic acid, (9) cis-13-docosenoic acid, (10) cis-15-tetracosenoic acid, (11) linoleic acid, (12) linolenic acid, (13) cis-8,11,14-eicosatrienoic acid, (14) 5,8,11,14-eicosa tetraenoic acid, and (15) cis-5,8,11,14,17-eicosapentaenoic acid.

25. A conductive ink composition in accordance with claim 20 wherein said conductive compound is selected from the group consisting of (1) azidotris(diethylamino) phosphonium bromide, (2) tetrabutylphosphonium chloride, (3) dodecyltriphenylphosphonium bromide, (4) stearyl tributyl phosphonium bromide, (5) trimethylsulfonium methyl sulfate, (6) 3-ethyl-5-(2-hydroxyethyl)-4-methylthiazolium bromide, and (7) 3,4-dimethyl-5-(2-hydroxyethyl) thiazolium iodide.

26. A conductive ink composition in accordance with claim 20 wherein said lightfastness component compound is selected from the group consisting of (1) tetrakis (2,4-ditert butyl phenyl)-4,4'-biphenyl diphosphonite, (2) antimony dialkyl phosphoro dithioate, (3) nickel-bis(o-ethyl 3,5-di-tert-butyl-4-hydroxy benzyl) phosphonate, (4) tetra sodium-N-(1,2-dicarboxyethyl)-N-octadecyl sulfosuccinamate, and (5) 2,2,4-trimethyl-1,2-hydroquinoline.

27. An ink composition comprised of (1) polymer, (2) an acid compound of the formula $CH_3(CH_2)_m(CH_2CH=CH)_p(CH_2)_nCOOH$ wherein m and n represent the number of $(CH_2)$ segments and wherein p represents the number of $(CH_2CH=CH)$ segments, (3) a conductive component, and (4) a colorant, and wherein said polymer is (a) poly[(o-cresyl glycidyl ether)-co-formaldehyde], (b)poly[(phenyl glycidyl ether)-co-dicyclopentadiene], or (c) poly(bisphenol A-co-epichlorohydrin), glycidyl end-capped.

28. An ink in accordance with claim 27 further containing a lightfastness component.

29. An ink in accordance with claim 28 wherein the polymer is present in an amount of from about 5 to about 60 percent by weight, the acid is present in an amount of from about 10 to about 30 percent by weight, the conductive component is present in an amount of from about 5 to about 15 percent by weight, the lightfastness component is present in an amount of from about 0.1 to about 10 percent by weight, and the colorant is present in an amount of from about 1 to about 15 percent by weight, and wherein the total of said ink components and compounds is about 100 percent.

30. An ink in accordance with claim 27 wherein each of said m, p, and n represent a number of from about 1 to about 100.

31. An ink in accordance with claim 27 wherein said acid is selected from the group consisting of (1) trans-3-hexenoic acid, (2) trans-2-hexenoic acid, (3) 2-octenoic acid, (4) cis-5-dodecenoic acid, (5) cis-9-tetradecenoic acid, (6) cis-9-hexadecenoic acid, (7) eladic acid, (8) cis-11-eicosenoic acid, (9) cis-13-docosenoic acid, (10) cis-15-tetracosenoic acid, (11) linoleic acid, (12) linolenic acid, (13) cis-8,11,14-eicosatrienoic acid, (14) 5,8,11,14-eicosa tetraenoic acid, and (15) cis-5,8,11,14,17-eicosapentaenoic acid.

* * * * *